No. 697,756. Patented Apr. 15, 1902.
G. STERN.
ALTERNATING CURRENT METER.
(Application filed Aug. 23, 1900.)

(No Model.)

Witnesses:

Inventor:
George Stern,

UNITED STATES PATENT OFFICE.

GEORGE STERN, OF CHARLOTTENBURG, GERMANY, ASSIGNOR TO GENERAL ELECTRIC COMPANY, A CORPORATION OF NEW YORK.

ALTERNATING-CURRENT METER.

SPECIFICATION forming part of Letters Patent No. 697,756, dated April 15, 1902.

Application filed August 23, 1900. Serial No. 28,663. (No model.)

*To all whom it may concern:*

Be it known that I, GEORGE STERN, a subject of the Emperor of Germany, residing at Charlottenburg, Germany, have invented certain new and useful Improvements in Alternating-Current Meters, (Case No. 1,693,) of which the following is a specification.

My invention relates to alternating-current meters for three-phase systems, and has for its object to provide a new arrangement of the actuating-windings in such a meter.

My invention will be understood by reference to the following specification, taken in connection with the accompanying drawings, in which—

Figure 1:
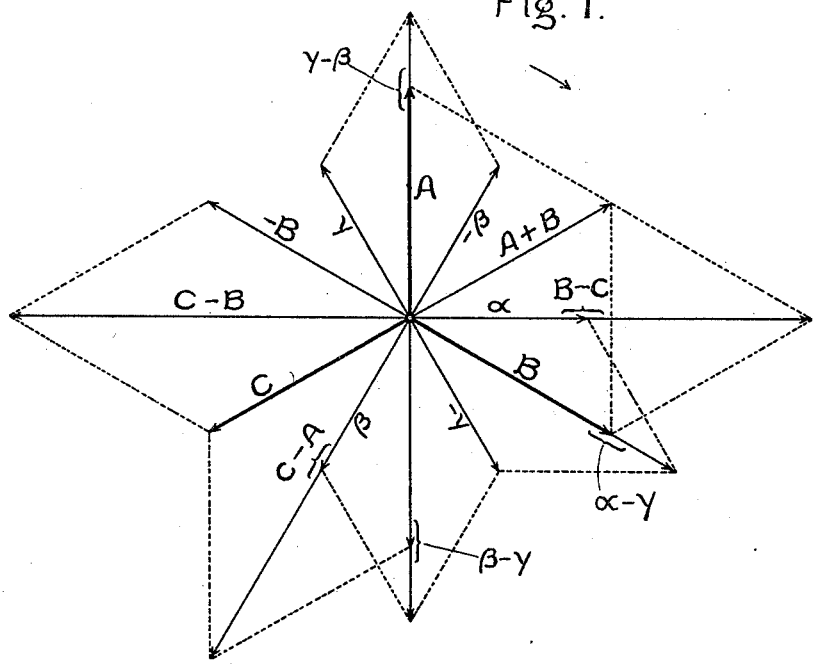
Figure 2:
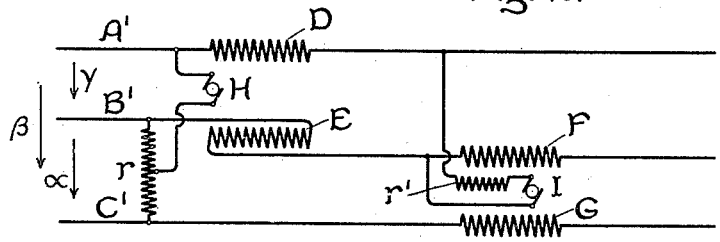

Figure 1 is a phase diagram; Fig. 2, a diagram illustrating one of the ways in which my invention may be applied to a commutator-meter, and Fig. 3 a diagram illustrating one of the ways in which my invention may be applied to a meter of the induction type.

There are several known methods for measuring the energy of a three-phase system by means of a combination of two meter systems. These methods are discussed in a series of patent specifications. The oldest method is set forth in German Patent No. 63,350. If we make use of the designations affixed to the diagram of Fig. 1, in which A B C represent the instantaneous values of the current in a three-phase system and $\alpha$ $\beta$ $\gamma$ the instantaneous values of the potential between the several mains, then this method may be expressed by the following equation:

$$\alpha B + (-\beta)A = k,$$

in which $k$ represents the instantaneous value of the energy. This may be formulated in words as follows: Two current vectors displaced by one hundred and twenty degrees in phase from one another are combined with two potential vectors, both of which lie in phase between the two current vectors and are so arranged that a phase displacement of thirty degrees exists between each current vector and its corresponding potential vector. The sum of the two products is a measure of energy. This formula expresses a law of general application. Every combination of current and potential vectors which has the above-described phase relations is suitable for measuring the energy of three-phase currents. German Patent No. 107,110 describes another application of this general law. If we compare Equation 9 of this patent specification with the diagram of Fig. 1, B—C and C—A are used for the current vectors, displaced in phase from one another by one hundred and twenty degrees, while $\alpha-\gamma$ and $\beta-\gamma$ serve as the potential vectors, which are displaced by thirty degrees from current vectors and which lie between the same. The equation reads:

$$(B-C)(\alpha-\gamma)+(C-A)(\beta-\gamma)=3k.$$

It is well understood that the current and potential values may be transposed in all formulæ for three-phase systems, and this applies in the expressions of the just-mentioned law. If we desire to measure the energy by means of two current vectors which are disposed at right angles to one another, it is readily seen that they must be combined with potential vectors in phase with the current vectors. This arrangement is used in German Patent No. 84,648. The application of this principle to an induction-meter is set forth in German Patent No. 100,748. The mathematical exposition of this law then becomes:

$$A(\gamma-\beta)+(B-C)\alpha=2k.$$

A third method constitutes the subject-matter of the present invention. Two current-vectors are used displaced by one hundred and fifty degrees in phase from one another and combined with potential vectors which are displaced thirty degrees from one another and sixty degrees from current vectors. In this case one of the current vectors is combined with a potential vector lying sixty degrees in advance thereof, while the other current vector is combined with a potential vector which lags sixty degrees behind the same. An expression for this method is given in the formula $$(A+B)(\gamma-\beta)+(C-B)\gamma=k.$$

An arrangement of the windings of a commutator-meter according to this invention is shown in Fig. 2. In this figure, D and E represent the field-windings of one of the measuring systems, and H the corresponding armature, while F and G represent the field-windings of the second measuring system, and I its armature. Both measuring systems are arranged in the usual manner to actuate a common counter, and the meter is provided with the customary retarding device. The windings D and E have the same effect as a single winding traversed by a current of the phase A+B, Fig. 1, and the armature H is supplied with a current of the phase $\gamma - \beta$, Fig. 1, by connecting it between the main A' and the middle point in a resistance $r$, connected across the mains B' and C'. For the other measuring system the windings F and G have the same effect as a single winding traversed by a current of the phase C−B, Fig. 1, and the armature I is supplied with a current of the phase $\gamma$, Fig. 1, obtained by connecting it across the mains A' and B', a resistance $r'$ being included in this circuit in order to reduce the current flowing therein to the required value.

Figure 3:
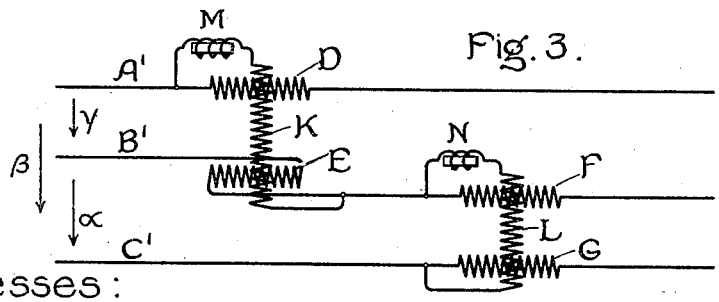

Fig. 3 shows an arrangement of the actuating-windings of an induction-meter operating according to my present invention. In this figure the meter comprises, as before, two measuring systems, each consisting of two series and one shunt winding. The windings are arranged in coöperative relation to the usual short-circuited armature operating a counter and provided with the customary retarding device.

The actuating-windings of both measuring systems may evidently operate on two separate armatures actuating a common shaft or they may operate on a single armature, as is well understood in the art. The windings D and E of the first system have, as before, the same effect as a single winding supplied with a current of the phase A+B, and the windings F and G of the second system have the same effect as a single winding supplied with current of the phase C−B. The potential winding K of the first system is supplied with a current of the phase C−B by connecting it across the mains A' and B' in a circuit so organized that the current therein will lag by sixty degrees behind its impressed electromotive force. In Fig. 3 I have indicated an inductive resistance M in series with the winding K; but evidently the necessary self-induction may be obtained in the winding itself or the current may be properly displaced in phase by any other suitable arrangement. The potential winding L of the second measuring system is supplied with a current of the phase A+B by connecting it across the mains B' and C' in a circuit so organized that the current therein will lag by thirty degrees behind its impressed electromotive force. In Fig. 3 I have indicated an inductive resistance N in series with the winding L, although any of the arrangements above referred to in connection with the first measuring system may be used for obtaining the same result. In both of the arrangements above described it is evident that other potentials may be employed to obtain the desired phase relations of the currents in the shunt-windings. In any case the windings and the magnetic circuits in the meter are to be so proportioned that the resultant torque will be proportional to the energy in the system.

What I claim as new, and desire to secure by Letters Patent of the United States, is—

1. A three-phase alternating-current meter comprising two measuring systems in which the current fluxes differ in phase from one another by one hundred and fifty degrees, each of said fluxes being produced by the combined action of windings in circuit with two of the three-phase mains, and in which the potential flux on non-inductive load lags in one system behind and in the other is in advance of the corresponding current flux.

2. In a three-phase alternating-current meter, two measuring systems, each comprising current-windings connected in circuit with two of the mains and a potential winding, the current-windings being so connected and arranged that the resultants of the current fluxes in the two systems are displaced in phase from one another by one hundred and fifty degrees, and the potential windings being connected and arranged to generate on a non-inductive load a potential flux lagging by a certain angle behind the current flux in one system and a potential flux leading the current flux by the same angle in the other system.

3. In a three-phase alternating-current induction-meter, two measuring systems, each comprising current-windings connected in circuit with two of the mains, and a potential winding, the current-windings being so connected and arranged that the resultants of the current fluxes in the two systems are displaced in phase from one another by one hundred and fifty degrees and the potential windings being connected and arranged to generate potential fluxes displaced in phase from one another by the same angle, the potential flux on non-inductive load lagging in one system behind and in the other leading the current flux.

In witness whereof I have hereunto set my hand this 8th day of August, 1900.

GEORGE STERN.

Witnesses:
GEORG GAGA,
M. HAUNKE.